(12) United States Patent
Wang

(10) Patent No.: US 12,474,962 B2
(45) Date of Patent: Nov. 18, 2025

(54) PROCESS COMMUNICATION METHOD AND APPARATUS, STORAGE MEDIUM, AND MOBILE TERMINAL

(71) Applicant: JRD COMMUNICATION (SHENZHEN) LTD., Guangdong (CN)

(72) Inventor: Binhong Wang, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 425 days.

(21) Appl. No.: 18/253,400

(22) PCT Filed: Dec. 3, 2020

(86) PCT No.: PCT/CN2020/133541
§ 371 (c)(1),
(2) Date: May 18, 2023

(87) PCT Pub. No.: WO2022/104924
PCT Pub. Date: May 27, 2022

(65) Prior Publication Data
US 2024/0004714 A1    Jan. 4, 2024

(30) Foreign Application Priority Data

Nov. 18, 2020 (CN) .......................... 202011292054.1

(51) Int. Cl.
*G06F 3/00* (2006.01)
*G06F 9/50* (2006.01)
*G06F 9/54* (2006.01)

(52) U.S. Cl.
CPC ............. *G06F 9/5027* (2013.01); *G06F 9/54* (2013.01); *G06F 2209/5011* (2013.01); *G06F 2209/5018* (2013.01)

(58) Field of Classification Search
CPC ........................................................ G06F 9/54
See application file for complete search history.

(56) References Cited

U.S. PATENT DOCUMENTS 11,163,606 B1 * 11/2021 Hampton ................ G06F 9/505
2004/0015979 A1    1/2004 Shen et al.
(Continued)

FOREIGN PATENT DOCUMENTS

CN         104038439 A  *  9/2014
CN         105635298 A  *  6/2016  ........... H04L 67/566
(Continued)

OTHER PUBLICATIONS

François Trahay, An analysis of the impact of multi-threading on communication performance. (Year: 2009).*
(Continued)

*Primary Examiner* — Lechi Truong
(74) *Attorney, Agent, or Firm* — PV IP PC; Wei Te Chung

(57) ABSTRACT

A process communication method and apparatus, a storage medium, and a mobile terminal. The method comprises: when a system process needs to communicate with an application process, determining whether an idle communication thread is present in a thread pool of the application process (101); if no idle communication thread is present in the thread pool of the application process, creating a first target communication thread (102); and communicating with the system process using the first target communication thread (103). By creating a target communication thread in a thread pool of an application process, abnormalities such as a frozen screen, restart and stuttering of a mobile terminal are avoided.

11 Claims, 3 Drawing Sheets

(56) References Cited

U.S. PATENT DOCUMENTS

| | | | |
|---|---|---|---|
| 2005/0086359 A1* | 4/2005 | Banerjee | G06F 9/5027 709/232 |
| 2006/0107261 A1* | 5/2006 | Vedula | G06F 9/5027 718/100 |
| 2008/0127206 A1 | 5/2008 | Leonov et al. | |
| 2009/0006520 A1* | 1/2009 | Abib | G06F 9/4881 709/201 |
| 2010/0037222 A1* | 2/2010 | Tatsubori | G06F 9/485 718/100 |
| 2016/0321116 A1 | 11/2016 | Schwartz, Jr. et al. | |
| 2017/0090979 A1* | 3/2017 | Dinan | G06F 9/5038 |
| 2017/0351551 A1* | 12/2017 | Manhardt | G06F 9/5066 |
| 2018/0287951 A1* | 10/2018 | Waskiewicz, Jr. | H04L 47/2441 |
| 2019/0171490 A1* | 6/2019 | Manhardt | H04L 67/10 |
| 2019/0370061 A1* | 12/2019 | Shah | G06F 9/545 |

FOREIGN PATENT DOCUMENTS

| | | |
|---|---|---|
| CN | 107450978 A | 12/2017 |
| CN | 107463439 A | 12/2017 |
| CN | 107704363 A | 2/2018 |
| CN | 107832146 A | 3/2018 |
| CN | 108924128 A | 11/2018 |
| JP | 2011210144 A * | 10/2011 |
| JP | 2013182502 A * | 9/2013 |

OTHER PUBLICATIONS

Chinese Office Action issued in corresponding Chinese Patent Application No. 202011292054.1 dated Jun. 20, 2023, pp. 1-8.
Java Java Concurrency in Practice , 1 Brian Goetz , 141-143.
Notification to Grant Patent Right for Invention issued in corresponding Chinese Patent Application No. 202011292054.1 dated Oct. 30, 2023, pp. 1-4.
Written Opinion of the International Search Authority in international application No. PCT/CN2020/133541, mailed on Aug. 16, 2021.
International Search Report in International application No. PCT/CN2020/133541, mailed on Aug. 16, 2021.
Chinese Office Action issued in corresponding Chinese Patent Application No. 202011292054.1 dated Nov. 22, 2022, pp. 1-7.

* cited by examiner

PROCESS COMMUNICATION METHOD AND APPARATUS, STORAGE MEDIUM, AND MOBILE TERMINAL

CROSS REFERENCE TO RELATED APPLICATIONS

This application is a US national phase application based upon an International Application No. PCT/CN2020/133541, filed on Dec. 3, 2020, titled "PROCESS COMMUNICATION METHOD AND APPARATUS, STORAGE MEDIUM, AND MOBILE TERMINAL", which claims the priority of the Chinese patent application filed on Nov. 18, 2020, with the application number of 202011292054.1 with the invention titled "PROCESS COMMUNICATION METHOD AND APPARATUS, STORAGE MEDIUM, AND MOBILE TERMINAL", the entirety of which is incorporated by reference in this application.

BACKGROUND OF DISCLOSURE

Field of Disclosure

The present application relates to the field of communication technologies, and in particular, to a process communication method, device, storage medium and mobile terminal.

Description of Related Art

In the ANDROID operating system (Android®), data transmission is often required between applications and services. Generally, inter-process communication can be used. For example, the Binder mechanism can be used to transmit data to obtain each other's data.

Currently, when an application and a service perform inter-processes communication through the Binder mechanism, if the system process requests to communicate with the application process when all threads in the application process are in working state, it will cause the mobile terminal to freeze, restart, and laggy and encounter other anomalies.

SUMMARY

Technical Problem

The embodiment of the present application provides a process communication method operable to prevent the occurrence of abnormal situations such as screen freezing, restarting, and lagging of the mobile terminal.

Technical Solution

In a first aspect, an embodiment of the present application provides a process communication method, including:
  determining whether an application process has idle communication threads in a thread pool of the application process when a system process needs to communicate with the application process;
  creating a first target communication thread if the application process has no idle communication thread in the thread pool of the application process; and
  using the first target communication thread to communicate with the system process.

Further, in the process communication method, after using the first target communication thread to communicate with the system process, the method further includes:
  determining again whether the application process has idle communication threads in the thread pool of the application process when the system process needs to communicate with the application process again;
  determining whether the number of idle communication threads in the thread pool of the application process is not less than a first preset number if the application process has an idle communication thread in the thread pool of the application process;
  destroying the first target communication thread after the communication between the first target communication thread and the system process is completed if the number of idle communication threads in the thread pool of the application process is not less than the first preset number; and
  using any of the idle communication threads to communicate with the system process that needs to communicate again.

Further, in the process communication method, after determining whether the number of idle communication threads in the thread pool of the application process is not less than a first preset number, the method further includes:
  determining whether the first target communication thread is in an idle state if the number of idle communication threads in the thread pool of the application process is less than a first preset number; and
  using the first target communication thread to communicate with the system process that needs to communicate again if the first target communication thread is in an idle state.

Further, in the process communication method, after determining whether the first target communication thread is in an idle state, the method further includes:
  determining whether the number of idle communication threads in the thread pool of the application process is not less than a second preset number if the first target communication thread is not in an idle state, wherein the second preset number is less than the first preset number; and
  using any idle communication thread to communicate with the system process that needs to communicate again if the number of idle communication threads in the thread pool of the application process is not less than the second preset number.

Further, in the process communication method, after determining whether the number of idle communication threads in the thread pool of the application process is not less than a second preset number, the method further includes:
  creating a second target communication thread if the number of idle communication threads in the thread pool of the application process is less than the second preset number; and
  using the second target communication thread to communicate with the system process that needs to communicate again.

Further, in the process communication method, after determining whether the first target communication thread is in an idle state, the method further includes:
  creating a second target communication thread if the first target communication thread is not in an idle state; and
  using the second target communication thread to communicate with the system process that needs to communicate again.

Further, in the process communication method, after determining whether the application process has idle communication threads in the thread pool of the application process, the method further includes:

using the idle communication threads to communicate with the system process if the application process has idle communication threads in the thread pool of the application process.

In a second aspect, an embodiment of the present application further provides a process communication device, which is characterized by comprising:

a determining module configured to determine whether the application process has idle communication threads in a thread pool of the application process when the system process needs to communicate with the application process;

a creating module configured to create a first target communication thread if the application process has no idle communication thread in the thread pool of the application process; and a communication module configured to using the first target communication thread to communicate with the system process.

In a third aspect, an embodiment of the present application further provides a computer-readable storage medium, where a computer program is stored in the storage medium, and when the computer program runs on the computer, the computer is caused to execute the following method:

determining whether an application process has idle communication threads in a thread pool of the application process when a system process needs to communicate with the application process;

creating a first target communication thread if the application process has no idle communication thread in the thread pool of the application process; and using the first target communication thread to communicate with the system process.

Further, in the computer-readable storage medium, after using the first target communication thread to communicate with the system process, the method further includes:

determining again whether the application process has idle communication threads in the thread pool of the application process when the system process needs to communicate with the application process again;

determining whether the number of idle communication threads in the thread pool of the application process is not less than a first preset number if the application process has an idle communication thread in the thread pool of the application process;

destroying the first target communication thread after the communication between the first target communication thread and the system process is completed if the number of idle communication threads in the thread pool of the application process is not less than the first preset number; and using any of the idle communication threads to communicate with the system process that needs to communicate again.

Further, in the computer-readable storage medium, after determining whether the number of idle communication threads in the thread pool of the application process is not less than a first preset number, the method further includes:

determining whether the first target communication thread is in an idle state if the number of idle communication threads in the thread pool of the application process is less than a first preset number; and using the first target communication thread to communicate with the system process that needs to communicate again if the first target communication thread is in an idle state.

Further, in the computer-readable storage medium, after determining whether the first target communication thread is in an idle state, the method further includes:

determining whether the number of idle communication threads in the thread pool of the application process is not less than a second preset number if the first target communication thread is not in an idle state, wherein the second preset number is less than the first preset number; and using any idle communication thread to communicate with the system process that needs to communicate again if the number of idle communication threads in the thread pool of the application process is not less than the second preset number.

Further, in the computer-readable storage medium, after determining whether the number of idle communication threads in the thread pool of the application process is not less than a second preset number, the method further includes:

creating a second target communication thread if the number of idle communication threads in the thread pool of the application process is less than the second preset number; and using the second target communication thread to communicate with the system process that needs to communicate again.

Further, in the computer-readable storage medium, after determining whether the first target communication thread is in an idle state, the method further includes:

creating a second target communication thread if the first target communication thread is not in an idle state; and using the second target communication thread to communicate with the system process that needs to communicate again.

Further, in the computer-readable storage medium, after determining whether the application process has idle communication threads in a thread pool of the application process, the method further includes:

using the idle communication threads to communicate with the system process if the application process has idle communication threads in the thread pool of the application process.

In a fourth aspect, the embodiments of the present application also provide a mobile terminal, the mobile terminal includes a processor and a memory, and a computer program is stored in the memory, and the processor calls the computer program stored in the memory to execute a method comprising:

determining whether an application process has idle communication threads in a thread pool of the application process when a system process needs to communicate with the application process;

using the idle communication threads to communicate with the system process if the application process has idle communication threads in the thread pool of the application process;

creating a first target communication thread if the application process has no idle communication thread in the thread pool of the application process;

using the first target communication thread to communicate with the system process;

determining again whether the application process has idle communication threads in the thread pool of the application process when the system process needs to communicate with the application process again;

determining whether the number of idle communication threads in the thread pool of the application process is not less than a first preset number if the application process has an idle communication thread in the thread pool of the application process;

destroying the first target communication thread after the communication between the first target communication thread and the system process is completed if the number of idle communication threads in the thread pool of the application process is not less than the first preset number; and using any of the idle communication threads to communicate with the system process that needs to communicate again.

Further, in the mobile terminal, after determining whether the number of idle communication threads in the thread pool of the application process is not less than a first preset number, the method further includes:

determining whether the first target communication thread is in an idle state if the number of idle communication threads in the thread pool of the application process is less than a first preset number; and using the first target communication thread to communicate with the system process that needs to communicate again if the first target communication thread is in an idle state.

Further, in the mobile terminal, after determining whether the first target communication thread is in an idle state, the method further includes:

determining whether the number of idle communication threads in the thread pool of the application process is not less than a second preset number if the first target communication thread is not in an idle state, wherein the second preset number is less than the first preset number; and using any idle communication thread to communicate with the system process that needs to communicate again if the number of idle communication threads in the thread pool of the application process is not less than the second preset number.

Further, in the mobile terminal, after determining whether the number of idle communication threads in the thread pool of the application process is not less than a second preset number, the method further includes:

creating a second target communication thread if the number of idle communication threads in the thread pool of the application process is less than the second preset number; and using the second target communication thread to communicate with the system process that needs to communicate again.

Further, in the mobile terminal, after determining whether the first target communication thread is in an idle state, the method further includes:

creating a second target communication thread if the first target communication thread is not in an idle state; and using the second target communication thread to communicate with the system process that needs to communicate again.

Beneficial effects: The present invention provides a process communication method, comprising: when a system process needs to communicate with an application process, determining whether the application process has idle communication threads in a thread pool of the application process; if the application process has no idle communication thread in the thread pool of the application process thread, creating a first target communication thread; using the first target communication thread to communicate with the system process. By creating a target communication thread when the application process has no idle communication thread in the thread pool of the application process. Thus, the situation that the system process cannot communicate with the application process is avoided, thereby avoiding the occurrence of abnormal situations such as screen freezing, restarting, and lagging of the mobile terminal.

Beneficial Effects of the Invention

BRIEF DESCRIPTION OF DRAWINGS

In order to illustrate the technical solutions in the embodiments of the present application more clearly, the following briefly introduces the drawings that are used in the description of the embodiments. Obviously, the drawings in the following description are only some embodiments of the present application. For those skilled in the art, other drawings can also be obtained from these drawings without creative effort.

DETAILED DESCRIPTION OF EMBODIMENTS

The technical solutions in the embodiments of the present application will be clearly and completely described below with reference to the accompanying drawings in the embodiments of the present application. Obviously, the described embodiments are only a part of the embodiments of the present application, but not all of the embodiments. Based on the embodiments in the present application, all other embodiments obtained by those skilled in the art without creative work fall within the protection scope of the present application.

Figure 1A:
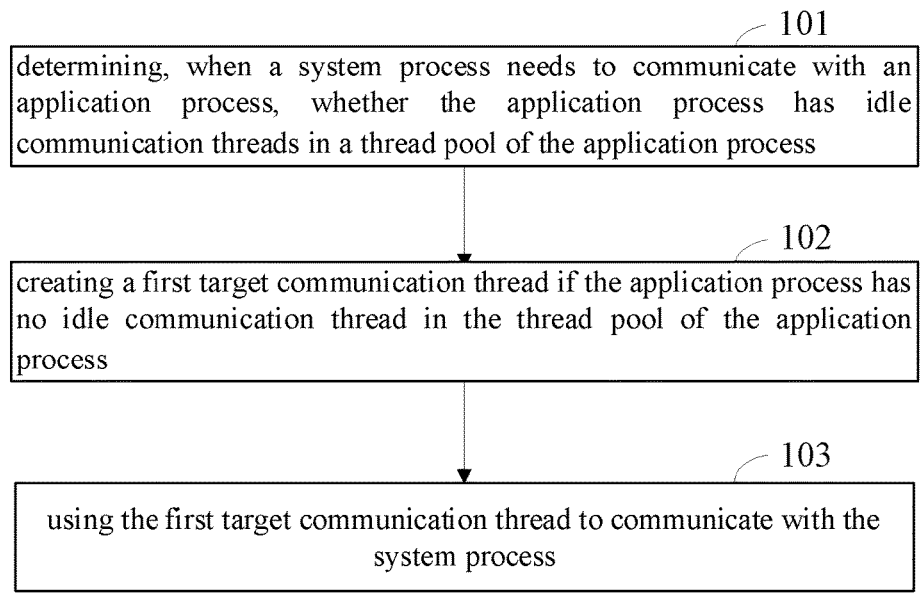
FIG. 1a is a first schematic flowchart of a process communication method provided by an embodiment of the present application.

Please refer to FIG. 1a. FIG. 1a is a first schematic flowchart of a process communication method provided by an embodiment of the present application. The process communication method includes:

Step 101: determining, when a system process needs to communicate with an application process, whether the application process has idle communication threads in a thread pool of the application process.

In particular, the system process needs to communicate with the application process through the Binder mechanism. Binder is a way of inter-process communication (IPC) in the Android system, and it is also one of the most important features in the Android system and services as a bridge for inter-process communication between four major component workflows (Activities) in Android are service (Service), broadcast receiver (Broadcast), content provider (ContentProvider), and different applications (App), all of which run in different processes. Just like its name "Binder", it glues the various components of the system together and acts as a bridge for each component.

Figure 1B:
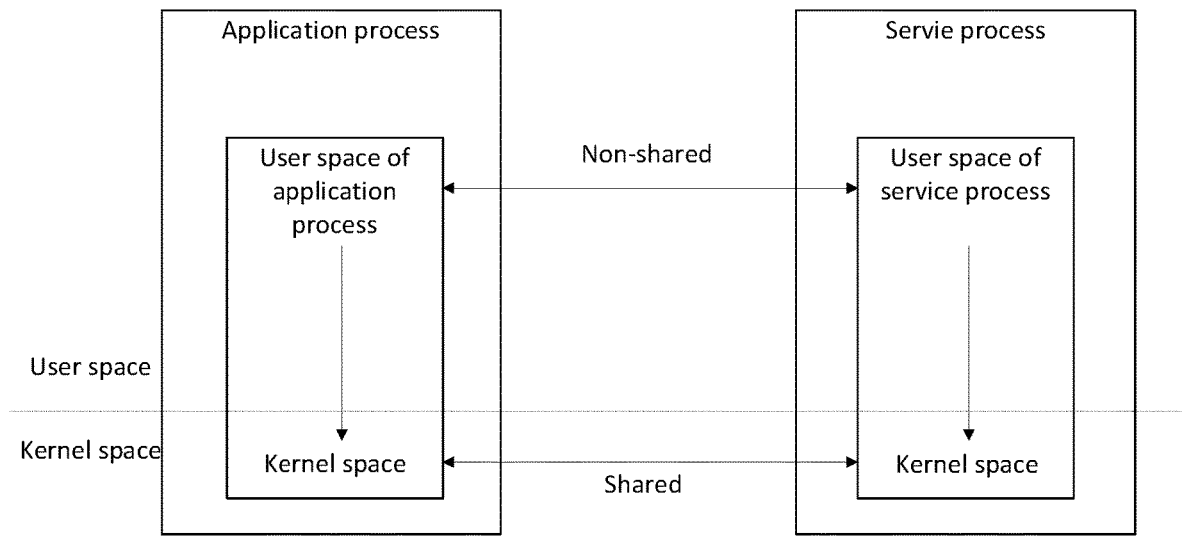
FIG. 1B is a schematic diagram showing the principle of inter-process communication provided by an embodiment of the present application.

Specifically, please refer to FIG. 1*b*, which is a schematic diagram showing the principle of inter-process communication provided by an embodiment of the present application. In particular, each Android process can only run in the virtual address space owned by its own process. For example, it corresponds to a 4 GB virtual address space, of which 3 GB is the user space and 1 GB is the kernel space. Of course, the size of the kernel space can be adjusted by parameter configuration. For user space, different processes cannot share with each other, but kernel space can be shared. The communication between the application process and the system process is actually achieved by using the kernel memory space that can be shared between processes for the underlying communication work. The application process and the system process often use ioctl (a function for a device driver to manage the I/O channel of the device) and other methods to interact with the drivers in the kernel space.

In particular, it can be determined whether there is an idle communication thread in the thread pool by determining whether each thread in the thread pool of the application process that the system process needs to communicate with is in an idle state.

Specifically, whether a process is a system process can be determined by determining the upper limit of the number of threads corresponding to the process. Since the upper limit of the number of threads in the system process can be 32, and the upper limit of the number of threads in other processes is 16, if the upper limit of the number of threads in the process is 32, it can be determined that the process is a system process.

Step 102: creating a first target communication thread if the application process has no idle communication thread in the thread pool of the application process.

In particular, if all the communication threads in the thread pool of the application process are in a working state or a communication state, it can be determined that there are no idle communication threads in the thread pool. Since the system process needs to communicate with the application process, a target communication thread can be created, so as to realize the communication between the system process and the application process.

Step 103: using the first target communication thread to communicate with the system process.

After the first target communication thread is created in step 102, the first target communication thread can be used to communicate with the system process.

In some embodiments, after using the first target communication thread to communicate with the system process, the method further includes:
  (1) determining again whether the application process has idle communication threads in the thread pool of the application process when the system process needs to communicate with the application process again;
  (2) determining whether the number of idle communication threads in the thread pool of the application process is not less than a first preset number if the application process has an idle communication thread in the thread pool of the application process;
  (3) destroying the first target communication thread after the communication between the first target communication thread and the system process is completed if the number of idle communication threads in the thread pool of the application process is not less than the first preset number;
  (4) using any of the idle communication threads to communicate with the system process that needs to communicate again.

In particular, if the system process requests to communicate with the application process again, since it is unknown whether the application process has idle communication threads in the thread pool of the application process at the current time point, it is necessary to re-determine whether there are idle communication threads. In addition, in order to avoid that the tasks of the application process itself cannot be processed by the threads due to the insufficient number of idle communication threads, it is also necessary to determine whether the number of idle communication threads is not less than the first preset number, for example, 5. If it is not less than the first preset number, the first target communication thread may be destroyed after the communication between the system process and the application process on the first target communication thread is completed. Any idle communication thread can be used to communicate with the system process that needs to communicate again.

In some embodiments, after determining whether the number of idle communication threads in the thread pool of the application process is not less than a first preset number, the method further includes:
  (1) determining whether the first target communication thread is in an idle state if the number of idle communication threads in the thread pool of the application process is less than a first preset number;
  (2) using the first target communication thread to communicate with the system process that needs to communicate again if the first target communication thread is in an idle state.

In particular, if the number of idle communication threads in the thread pool is less than the first preset number, it is determined whether the first target communication thread is in an idle state at the current time point. If it is in an idle state, the first target communication thread is preferentially used for communication.

In some embodiments, after determining whether the first target communication thread is in an idle state, the method further includes:
  (1.1) creating a second target communication thread if the first target communication thread is not in an idle state;
  (1.2) using the second target communication thread to communicate with the system process that needs to communicate again.

In particular, if the first target communication thread is not in an idle state, a second target communication thread needs to be created again, and using the second target communication thread to communicate with the system process that needs to communicate again.

In some embodiments, after determining whether the first target communication thread is in an idle state, the method further includes:
  (1.1) determining whether the number of idle communication threads in the thread pool of the application process is not less than a second preset number if the first target communication thread is not in an idle state, and the second preset number is less than the first preset number;
  (1.2) using any idle communication thread to communicate with the system process that needs to communicate again if the number of idle communication threads in the thread pool of the application process is not less than the second preset number.

In particular, if it is detected that the first target communication thread at the current time point is not in an idle state, then it is further detected whether the number of idle communication threads in the thread pool is not less than a second preset number, where the second preset number is typically 2 or 3. The purpose of setting the second preset number is to prevent the communication of the system process from affecting the task processing of the application process itself, so the second preset number of threads will be reserved for the application process itself. Therefore, if the number of idle threads in the thread pool is not less than the second preset number, any idle communication thread is used for communication.

In some embodiments, after determining whether the number of idle communication threads in the thread pool of the application process is not less than a second preset number, the method further includes:

(1.1) creating a second target communication thread if the number of idle communication threads in the thread pool of the application process is less than the second preset number;

(1.2) using the second target communication thread to communicate with the system process that needs to communicate again.

In particular, if the number of idle communication threads in the thread pool is less than the second preset number, that is, if idle communication threads are used for system process and application processes, the application process's own task cannot be processed. Therefore, it is forbidden to use idle communication threads to communicate with system process. In order to ensure the normal communication of the system process, a second target communication thread can be created subsequently, and the second target communication thread can be used to communicate with the system process.

In some embodiments, after determining whether the application process has idle communication threads in the thread pool of the application process, the method further includes:

(1) using the idle communication threads to communicate with the system process if the application process has idle communication threads in the thread pool of the application process.

In particular, if there is an idle communication thread in the thread pool, the idle communication thread is directly used to communicate with the system process, and there is no need to create a first target communication thread.

It can be seen from the above that in the embodiment of the present application, when the system process needs to communicate with the application process, it is determined whether the application process has idle communication threads in a thread pool of the application process. If the application process has no idle communication thread in the thread pool of the application process, a first target communication thread is created. The first target communication thread is used to communicate with the system process. By creating a target communication thread when the application process has no idle communication thread in the thread pool of the application process, the situation that the system process cannot communicate with the application process is avoided, thereby avoiding the occurrence of abnormal situations such as screen freezing, restarting, and lagging of the mobile terminal.

Figure 2:
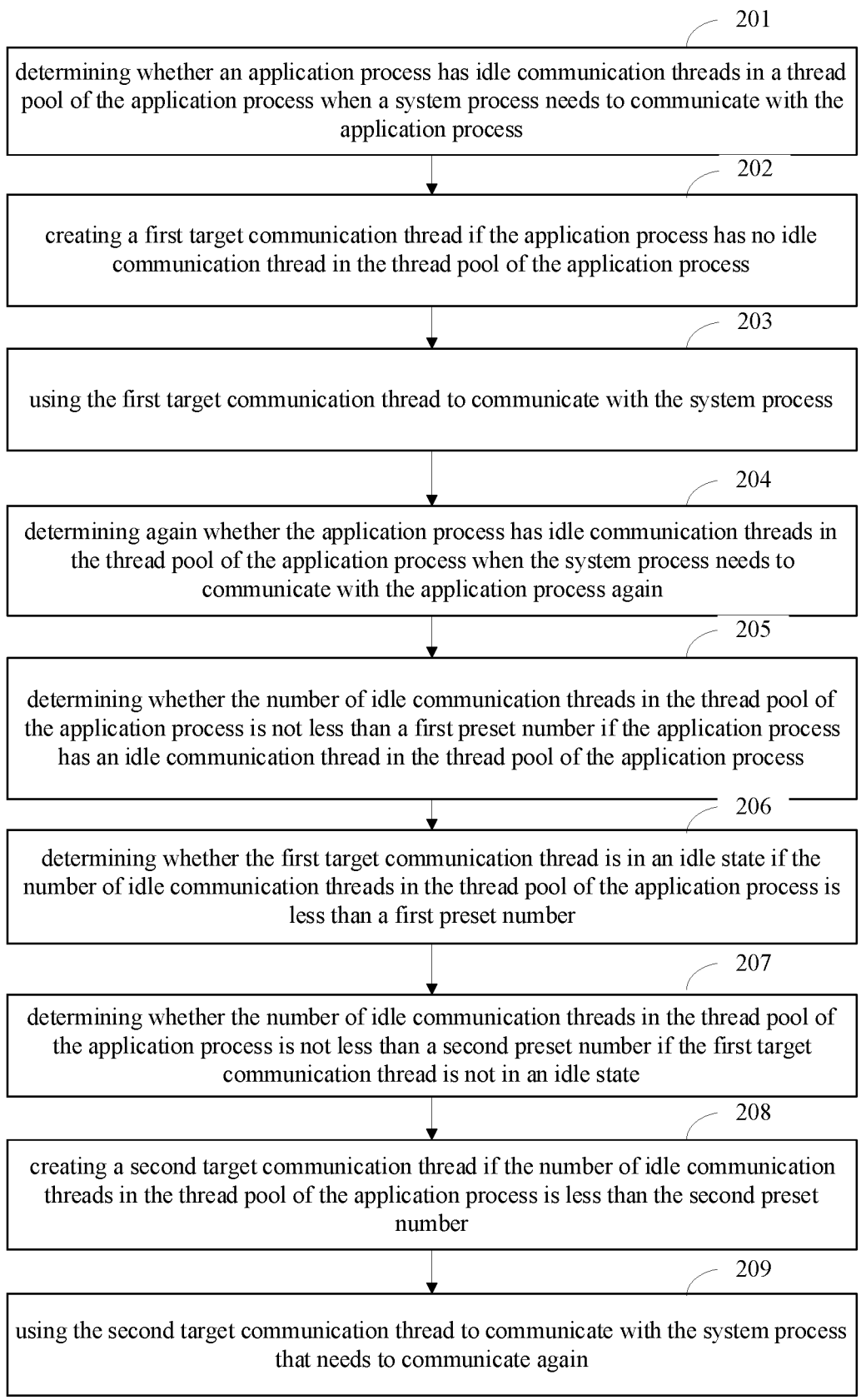
FIG. 2 is a second schematic flowchart of process communication method provided by an embodiment of the present application.

In some embodiments, as shown in FIG. 2, a process communication method is provided, and the process communication method includes:

Step 201: determining whether an application process has idle communication threads in a thread pool of the application process when a system process needs to communicate with the application process.

In particular, the system process needs to communicate with the application process through the Binder mechanism. Binder is a way of inter-process communication (IPC) in the Android system, and it is also one of the most important features in the Android system and services as a bridge for inter-process communication between four major component workflows (Activities) in Android are service (Service), broadcast receiver (Broadcast), content provider (ContentProvider), and different applications (App), all of which run in different processes. Just like its name "Binder", it glues the various components of the system together and acts as a bridge for each component.

In particular, it can be determined whether there are idle communication threads in the thread pool by determining whether each thread in the thread pool of the application process that the system process needs to communicate with is in an idle state.

Specifically, whether it is a system process can be determined by determining the upper limit of the number of threads corresponding to the process. Since the upper limit of the number of threads in the system process can be 32, and the upper limit of the number of threads in other processes is 16, if the upper limit of the number of threads in the process is 32, it can be determined that the process is a system process.

Step 202: creating a first target communication thread if the application process has no idle communication thread in the thread pool of the application process.

In particular, if all the communication threads in the thread pool of the application process are in the working state or the communication state, it can be determined that there are no idle communication threads in the thread pool. Since the system process needs to communicate with the application process, a target communication thread can be created, so as to realize the communication between the system process and the application process.

Step 203: using the first target communication thread to communicate with the system process.

After the first target communication thread is created in step 203, the first target communication thread can be used to communicate with the system process.

Step 204: determining again whether the application process has idle communication threads in the thread pool of the application process when the system process needs to communicate with the application process again.

In particular, if the system process requests to communicate with the application process again, since it is unknown whether the application process has idle communication threads in the thread pool of the application process at the current time point, it is necessary to re-determine whether there are idle communication threads. In addition, in order to avoid that the task of the application process itself cannot be processed by the threads due to the insufficient number of idle communication threads, it is also necessary to determine whether the number of idle communication threads is not less than the first preset number, for example, 5. If it is not less than the first preset number, the first target communication thread may be destroyed after the communication between the system process and the application process on the first target communication thread is completed. Any idle communication thread can be used to communicate with the system process that needs to communicate again.

Step 205: determining whether the number of idle communication threads in the thread pool of the application process is not less than a first preset number if the application process has an idle communication thread in the thread pool of the application process.

Step 206: determining whether the first target communication thread is in an idle state if the number of idle communication threads in the thread pool of the application process is less than a first preset number.

In particular, if the number of idle communication threads in the thread pool is less than the first preset number, it is determined whether the first target communication thread is in an idle state at the current time point. If it is in an idle state, the first target communication thread is preferentially used for communication.

Step 207: If the first target communication thread is not in an idle state, the thread pools of the application process, are took for the determination. Among the thread pools of the application process, if it is detected that the first target communication thread at the current time point is not in an idle state, then it is determined whether the number of communication threads is not less than the second preset number, where the second preset number is typically 2 or 3. The purpose of setting the second preset number is to prevent the communication of the system process from affecting the task processing of the application process itself. Therefore, the second preset number of threads will be reserved for the application process itself. Therefore, if the number of threads is not less than the second preset number, any idle communication thread is used for communication.

Step 208: creating a second target communication thread if the number of idle communication threads in the thread pool of the application process is less than the second preset number.

In particular, if the number of idle communication threads in the thread pool is less than the second preset number, that is, if idle communication threads are used for system process and application processes, the application process's own task cannot be processed. Therefore, it is forbidden to use idle communication threads to communicate with system process. In order to ensure the normal communication of the system process, a second target communication thread can be created subsequently, and the second target communication thread can be used to communicate with the system process.

Step 209: using the second target communication thread to communicate with the system process that needs to communicate again.

It can be seen from the above that in the embodiment of the present application, when the system process needs to communicate with the application process, it is determined whether the application process has idle communication threads in a thread pool of the application process. If the application process has no idle communication thread in the thread pool of the application process, a first target communication thread is created. The first target communication thread is used to communicate with the system process. By creating a target communication thread when the application process has no idle communication thread in the thread pool of the application process, the situation that the system process cannot communicate with the application process is avoided, thereby avoiding the occurrence of abnormal situations such as screen freezing, restarting, and lagging of the mobile terminal.

In order to facilitate better implementation of the process communication method provided by the embodiment of the present application, an embodiment also provides a process communication apparatus. The meanings of the nouns are the same as those in the above process communication method, and the specific details for implementation may refer to the descriptions in the method embodiments.

Figure 3:
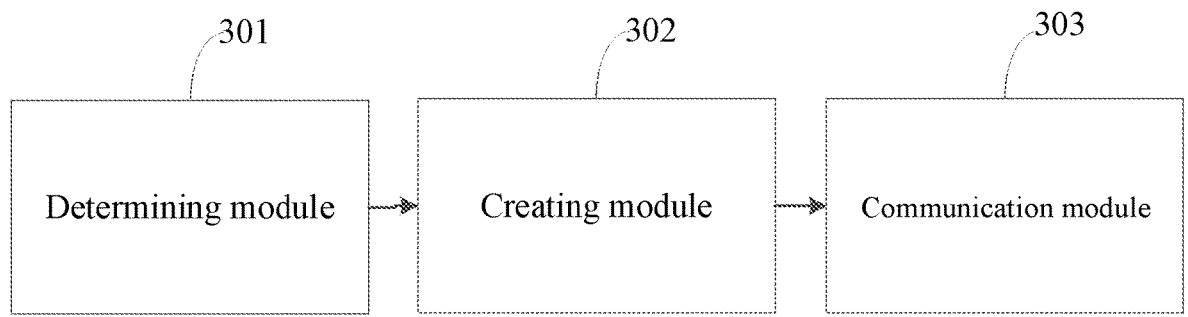
FIG. 3 is a schematic structural diagram of a process communication apparatus provided by an embodiment of the present application.

In some embodiments, a process communication apparatus is also provided. As shown in FIG. 3, the process communication apparatus may include: a determining module 301, a creating module 302, a communication module 303, a second reporting module 304, and the like.

The determining module 301 is used to determine whether the application process has idle communication threads in a thread pool of the application process when the system process needs to communicate with the application process;

A creating module 302, configured to create a first target communication thread if the application process has no idle communication thread in the thread pool of the application process;

The communication module 303 is configured to using the first target communication thread to communicate with the system process.

During specific implementation, the above units can be implemented as independent entities, or can be arbitrarily combined to be implemented as the same or several entities. The specific implementation of the above units can refer to the previous method embodiments, which will not be repeated here.

It can be seen from the above that the process communication method of the embodiment of the present application adopts the determining module 301 to determine whether the application process has idle communication threads in a thread pool of the application process when the system process needs to communicate with the application process. If there is no idle communication thread in the thread pool of the application process, a first target communication thread is created. The communication module 303 uses the first target communication thread to communicate with the system process. By creating a target communication thread when the application process has no idle communication thread in the thread pool of the application process, the situation that the system process cannot communicate with the application process is avoided, thereby avoiding the occurrence of abnormal situations such as screen freezing, restarting, and lagging of the mobile terminal.

Embodiments of the present application also provide a computer-readable storage medium, where a computer program is stored in the storage medium, and when the computer program runs on the computer, the computer is caused to execute the following method:

determining whether an application process has idle communication threads in a thread pool of the application process when a system process needs to communicate with the application process;

creating a first target communication thread if the application process has no idle communication thread in the thread pool of the application process;

using the first target communication thread to communicate with the system process.

In particular, after using the first target communication thread to communicate with the system process, the method further includes:

determining again whether the application process has idle communication threads in the thread pool of the application process when the system process needs to communicate with the application process again;

determining whether the number of idle communication threads in the thread pool of the application process is not less than a first preset number if the application process has an idle communication thread in the thread pool of the application process;

destroying the first target communication thread after the communication between the first target communication thread and the system process is completed if the number of idle communication threads in the thread pool of the application process is not less than the first preset number;

using any of the idle communication threads to communicate with the system process that needs to communicate again.

In particular, after determining whether the number of idle communication threads in the thread pool of the application process is not less than the first preset number, the method further includes:

determining whether the first target communication thread is in an idle state if the number of idle communication threads in the thread pool of the application process is less than a first preset number;

using the first target communication thread to communicate with the system process that needs to communicate again if the first target communication thread is in an idle state.

In particular, after determining whether the first target communication thread is in an idle state, the method further includes:

determining whether the number of idle communication threads in the thread pool of the application process is not less than a second preset number if the first target communication thread is not in an idle state, wherein the second preset number is less than the first preset number;

using any idle communication thread to communicate with the system process that needs to communicate again if the number of idle communication threads in the thread pool of the application process is not less than the second preset number.

In particular, after determining whether the number of idle communication threads in the thread pool of the application process is not less than the second preset number, the method further includes:

creating a second target communication thread if the number of idle communication threads in the thread pool of the application process is less than the second preset number;

using the second target communication thread to communicate with the system process that needs to communicate again.

In particular, after determining whether the first target communication thread is in an idle state, the method further includes:

creating a second target communication thread if the first target communication thread is not in an idle state;

using the second target communication thread to communicate with the system process that needs to communicate again.

In particular, after determining whether the application process has idle communication threads in the thread pool of the application process, the method further includes:

using the idle communication threads to communicate with the system process if the application process has idle communication threads in the thread pool of the application process.

Based on the above method, the present invention also provides a storage medium on which a plurality of instructions are stored, wherein the instructions are applicable for being loaded by a processor and executing the disclosed method.

Those of ordinary skill in the art can understand that all or part of the steps in the various methods of the above embodiments can be completed by instructing relevant hardware through a program, and the program can be stored in a computer-readable storage medium, and the storage medium can include: Read only memory (ROM), random access memory (RAM), magnetic disk or optical disk, etc.

The embodiment of the present application also provides a mobile terminal, the mobile terminal includes a processor and a memory, a computer program is stored in the memory, and the processor calls the computer program stored in the memory to execute a method comprising:

determining whether an application process has idle communication threads in a thread pool of the application process when a system process needs to communicate with the application process;

using the idle communication threads to communicate with the system process if the application process has idle communication threads in the thread pool of the application process;

creating a first target communication thread if the application process has no idle communication thread in the thread pool of the application process;

using the first target communication thread to communicate with the system process;

determining again whether the application process has idle communication threads in the thread pool of the application process when the system process needs to communicate with the application process again;

determining whether the number of idle communication threads in the thread pool of the application process is not less than a first preset number if the application process has an idle communication thread in the thread pool of the application process;

destroying the first target communication thread after the communication between the first target communication thread and the system process is completed if the number of idle communication threads in the thread pool of the application process is not less than the first preset number;

using any of the idle communication threads to communicate with the system process that needs to communicate again.

In particular, after determining whether the number of idle communication threads in the thread pool of the application process is not less than the first preset number, the method further includes:

determining whether the first target communication thread is in an idle state if the number of idle communication threads in the thread pool of the application process is less than a first preset number;

using the first target communication thread to communicate with the system process that needs to communicate again if the first target communication thread is in an idle state.

In particular, after determining whether the first target communication thread is in an idle state, the method further includes:

determining whether the number of idle communication threads in the thread pool of the application process is not less than a second preset number if the first target communication thread is not in an idle state, wherein the second preset number is less than the first preset number;

using any idle communication thread to communicate with the system process that needs to communicate again if the number of idle communication threads in the thread pool of the application process is not less than the second preset number.

In particular, after determining whether the number of idle communication threads in the thread pool of the application process is not less than the second preset number, the method further includes:

creating a second target communication thread if the number of idle communication threads in the thread pool of the application process is less than the second preset number;

using the second target communication thread to communicate with the system process that needs to communicate again.

In particular, after determining whether the first target communication thread is in an idle state, the method further includes:

creating a second target communication thread if the first target communication thread is not in an idle state;

using the second target communication thread to communicate with the system process that needs to communicate again.

Figure 4:
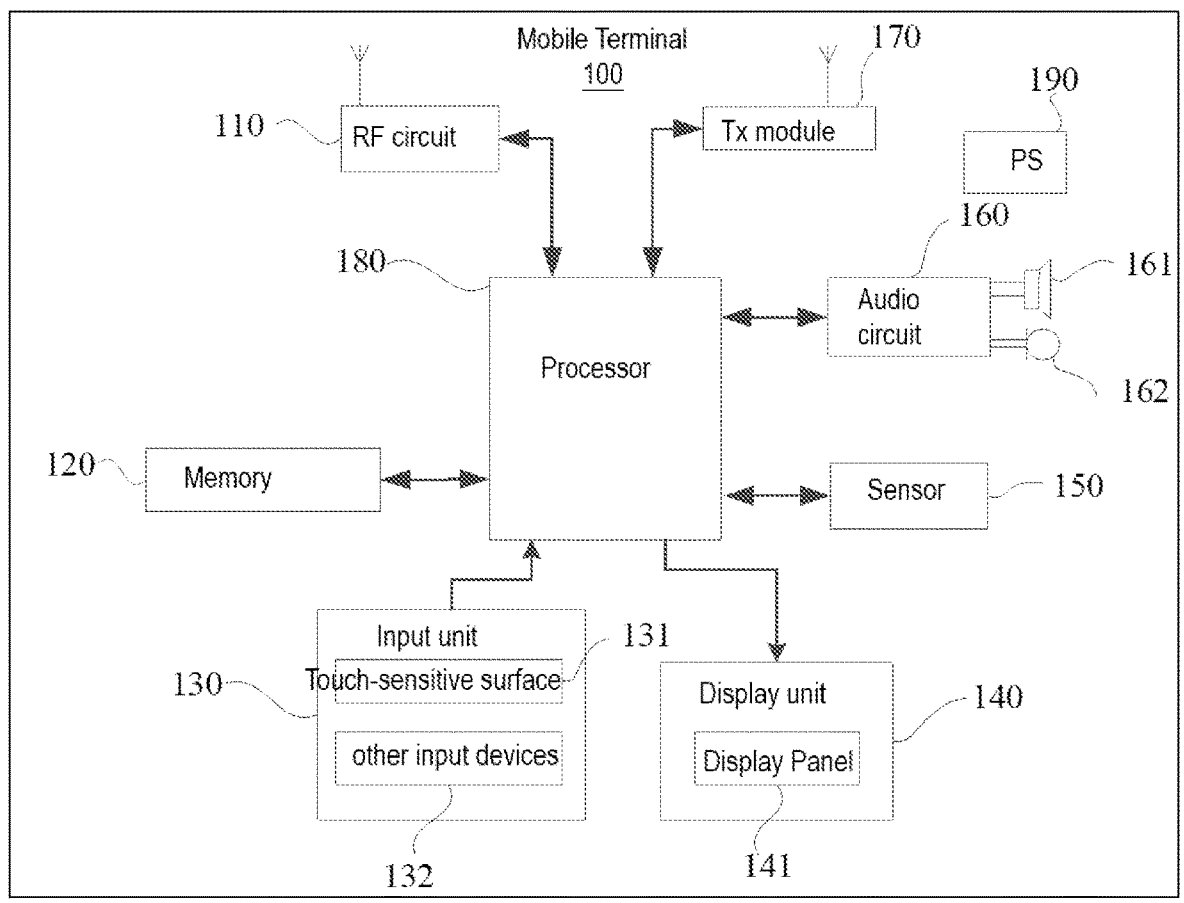
FIG. 4 is a specific structural diagram of a mobile terminal provided by an embodiment of the present application.

FIG. 4 shows a specific structural block diagram of a terminal provided by an embodiment of the present invention, and the terminal may be used to implement the disclosed method, storage medium, and terminal provided in the foregoing embodiments.

As shown in FIG. 4, the mobile terminal 1200 may include an radio frequency (RF) circuit 110, a memory 120 including one or more (only one is shown in the figure) computer-readable storage media, an input unit 130, and a display unit 140, the sensor 150, the audio circuit 160, the transmission module (Tx module) 170, the processor 180 including one or more (only one is shown in the figure) processing core, and the power supply (PS) 190 and other components. Those skilled in the art can understand that the structure of the mobile terminal 1200 shown in FIG. 4 does not constitute a limitation to the mobile terminal 1200, and may include more or less components than the one shown, or combine some components, or different components layout. In particular:

RF circuitry 110 may include various existing circuit elements for performing these functions, e.g., antennas, radio frequency transceivers, digital signal processors, encryption/decryption chips, subscriber identity module (SIM) cards, memory, and the like. The RF circuit 110 may communicate with various networks such as the Internet, an intranet, a wireless network, or with a second device over a wireless network. The aforementioned wireless network may include a cellular telephone network, a wireless local area network, or a metropolitan area network.

The memory 120 can be used to store software programs and modules, such as the program instructions/modules corresponding to the process communication method, device, storage medium and mobile terminal in the above-mentioned embodiments. The processor 180 runs the software programs and modules stored in the memory 120, thereby execute various functional applications and data processing, that is, realize the function of mutual recognition of chips. Memory 120 may include high-speed random access memory, and may also include non-volatile memory, such as one or more magnetic storage devices, flash memory, or a second non-volatile solid-state memory. In some instances, memory 120 may be a storage medium as described above.

The input unit 130 may be used to receive input numerical or character information, and generate keyboard, mouse, joystick, optical or trackball signal input related to user settings and function control. Specifically, the input unit 130 may include a touch-sensitive surface 131 as well as other input devices 132. Touch-sensitive surface 131, also known as a touch display or trackpad, collects touch operations by a user on or near it (such as a user operates using a finger, stylus, etc., any suitable object or accessory on or near touch-sensitive surface 131), and drive the corresponding connection device according to a preset program. Optionally, the touch-sensitive surface 131 may include two parts, a touch detection device and a touch controller.

The display unit 140 may be used to display information input by or provided to the user and various graphical user interfaces of the mobile terminal 1200, which may be composed of graphics, text, icons, videos, and any combination thereof. The display unit 140 may include a display panel 141, and further, the touch-sensitive surface 131 may cover the display panel 141. The display interface of the mobile terminal in the above-mentioned embodiment may be displayed by the display unit 140, that is, the display content of the display shot may be displayed by the display unit 140.

The mobile terminal 1200 may further include at least one sensor 150, such as a light sensor, a motion sensor, and a second sensor. Specifically, the light sensor may include an ambient light sensor and a proximity sensor, wherein the ambient light sensor may adjust the brightness of the display panel 141 according to the brightness of the ambient light, and the proximity sensor may close the display panel 141 when the mobile terminal 1200 is moved to the ear and/or backlight. As for the second sensor such as a gyroscope, a barometer, a hygrometer, a thermometer, and an infrared sensor that can be configured in the mobile terminal 1200, details are not described here.

The audio circuit 160, the speaker 161, and the microphone 162 may provide an audio interface between the user and the mobile terminal 1200. The audio circuit 160 can transmit the received audio data converted electrical signal to the speaker 161, and the speaker 161 converts it into a sound signal for output. On the other hand, the microphone 162 converts the collected sound signal into an electrical signal, which is received and converted by the audio circuit 160 into audio data, and then the audio data is output to the processor 180 for processing, and then sent to, for example, another terminal through the RF circuit 110, or the audio data is output to the memory 120 for further processing. The audio circuit 160 may also include an earphone jack to provide communication between peripheral headphones and the mobile terminal 1200.

The mobile terminal 1200 can help the user to send and receive emails, browse web pages, access streaming media, etc. through the transmission module 170, and provide the user with wireless broadband Internet access.

The processor 180 is the control center of the mobile terminal 1200, uses various interfaces and lines to connect various parts of the entire mobile phone, runs or executes the software programs and/or modules stored in the memory 120, and calls the data stored in the memory 120, perform various functions of the mobile terminal 1200 and process data, so as to monitor the mobile phone as a whole. Optionally, the processor 180 may include one or more processing cores. In some embodiments, the processor 180 may integrate an application processor and a modem processor, wherein the application processor mainly handles the operating system, user interface and applications, etc., the modem processor mainly deals with wireless communication. It can be understood that, the above-mentioned modulation and demodulation processor may not be integrated into the processor 180.

Specifically, the processor 180 includes: an arithmetic logic operation unit (ALU), application processor, global positioning system (GPS) and control and status bus (Bus) (not shown in the figure).

The mobile terminal 1200 also includes a power source 190 (such as a battery) for powering various components. In some embodiments, the power source can be logically connected to the processor 180 through a power management system, so as to manage power supply, discharge, and power consumption through the power management system. The power source 190 may also include one or more DC or AC power sources, repower systems, power failure detection circuits, power converters or inverters, power status indicators, and any other components.

Although not shown, the mobile terminal 1200 may further include a camera (e.g., a front-facing camera, a rear-facing camera), a Bluetooth module, and the like, which will not be repeated here.

Specifically in this embodiment, the display unit 140 of the mobile terminal 1200 is a touch screen display, and the mobile terminal 1200 further includes a memory 120 and one or more programs, where one or more of the programs are stored in memory 120 and are configured to be executed by one or more of the processors 180 one or more of the programs contain instructions for performing:
  determining whether an application process has idle communication threads in a thread pool of the application process when a system process needs to communicate with the application process;
  creating a first target communication thread if the application process has no idle communication thread in the thread pool of the application process;
  using the first target communication thread to communicate with the system process.

In some embodiments, after using the first target communication thread to communicate with the system process, the processor 380 may further execute instructions for the following operations:
  determining again whether the application process has idle communication threads in the thread pool of the application process when the system process needs to communicate with the application process again;
  determining whether the number of idle communication threads in the thread pool of the application process is not less than a first preset number if the application process has an idle communication thread in the thread pool of the application process;
  destroying the first target communication thread after the communication between the first target communication thread and the system process is completed if the number of idle communication threads in the thread pool of the application process is not less than the first preset number;
  using any of the idle communication threads to communicate with the system process that needs to communicate again.

In some embodiments, after determining whether the number of idle communication threads in the thread pool of the application process is not less than the first preset number, the processor 380 may further execute an instruction of the following operations:
  determining whether the first target communication thread is in an idle state if the number of idle communication threads in the thread pool of the application process is less than a first preset number;
  using the first target communication thread to communicate with the system process that needs to communicate again if the first target communication thread is in an idle state.

In some embodiments, after determining whether the first target communication thread is in an idle state, the processor 380 may further execute an instruction of the following operations:
  determining whether the number of idle communication threads in the thread pool of the application process is not less than a second preset number if the first target communication thread is not in an idle state, wherein the second preset number is less than the first preset number;
  using any idle communication thread to communicate with the system process that needs to communicate again if the number of idle communication threads in the thread pool of the application process is not less than the second preset number.

In some embodiments, after determining whether the number of idle communication threads in the thread pool of the application process is not less than the second preset number, the processor 380 may further execute an instruction of the following operations:
  creating a second target communication thread if the number of idle communication threads in the thread pool of the application process is less than the second preset number;
  using the second target communication thread to communicate with the system process that needs to communicate again.

In some embodiments, after determining whether the first target communication thread is in an idle state, the processor 380 may further execute instructions of the following operations:
  creating a second target communication thread if the first target communication thread is not in an idle state;
  using the second target communication thread to communicate with the system process that needs to communicate again.

In some embodiments, after determining whether the application process has idle communication threads in a thread pool of the application process, the processor 380 may further execute an instruction of the following operations:
  using the idle communication threads to communicate with the system process if the application process has idle communication threads in the thread pool of the application process.

In the above-mentioned embodiments, the description of each embodiment has its own emphasis. For parts that are not described in detail in a certain embodiment, reference may be made to the relevant descriptions of other embodiments.

The above embodiments provide a detailed description of the process communication method, device, storage medium and mobile terminal provided by the embodiments of this application, and specific examples are applied in this document to illustrate the principles and implementation of this application. The description of the above embodiments is only used to help understand the technical solution of this application and its core ideas. A person of ordinary skill in the art should understand that it is still possible to modify the technical solution recorded in the preceding embodiments, or to replace some of the technical features with equivalent ones; and these modifications or replacements do not make the corresponding technical solution out of the scope of the technical solution of the embodiments of this application.

The invnetion claimed is:

1. A process communication method, comprising:
   determining, when a system process needs to communicate with an application process, whether the application process has idle communication threads in a thread pool of the application process;
   using the idle communication threads to communicate with the system process if the application process has idle communication threads in the thread pool of the application process;
   creating a first target communication thread if the application process has no idle communication thread in the thread pool of the application process; and
   using the first target communication thread to communicate with the system process;
   wherein after using the first target communication thread to communicate with the system process, the method further comprises:
   determining again whether the application process has idle communication threads in the thread pool of the application process when the system process needs to communicate with the application process again;
   determining whether the number of idle communication threads in the thread pool of the application process is not less than a first preset number if the application process has an idle communication thread in the thread pool of the application process; and
   destroying the first target communication thread after the communication between the first target communication thread and the system process is completed if the number of idle communication threads in the thread pool of the application process is not less than the first preset number; and using any of the idle communication threads to communicate with the system process that needs to communicate again;
   wherein after determining whether the number of idle communication threads in the thread pool of the application process is not less than a first preset number, the method further comprises:
   determining whether the first target communication thread is in an idle state if the number of idle communication threads in the thread pool of the application process is less than a first preset number; and
   using the first target communication thread to communicate with the system process that needs to communicate again if the first target communication thread is in an idle state;
   wherein after determining whether the first target communication thread is in an idle state, the method further comprises:
   determining whether the number of idle communication threads in the thread pool of the application process is not less than a second preset number if the first target communication thread is not in an idle state, wherein the second preset number is less than the first preset number; and
   using any idle communication thread to communicate with the system process that needs to communicate again if the number of idle communication threads in the thread pool of the application process is not less than the second preset number.

2. The process communication method according to claim 1, wherein after determining whether the number of idle communication threads in the thread pool of the application process is not less than a second preset number, the method further comprises:
   creating a second target communication thread if the number of idle communication threads in the thread pool of the application process is less than the second preset number; and
   using the second target communication thread to communicate with the system process that needs to communicate again.

3. The process communication method according to claim 1, wherein after determining whether the first target communication thread is in an idle state, the method further comprises:
   creating a second target communication thread if the first target communication thread is not in an idle state; and
   using the second target communication thread to communicate with the system process that needs to communicate again.

4. The process communication method according to claim 1, wherein after determining whether the application process has idle communication threads in the thread pool of the application process, the method further comprises:
   using the idle communication threads to communicate with the system process if the application process has idle communication threads in the thread pool of the application process.

5. A non-transitory computer-readable storage medium, wherein a computer program is stored in the storage medium, and, when being executed by a computer, directs the computer to execute a method comprising:
   determining whether an application process has idle communication threads in a thread pool of the application process when a system process needs to communicate with the application process;
   using the idle communication threads to communicate with the system process if the application process has idle communication threads in the thread pool of the application process;
   creating a first target communication thread if the application process has no idle communication thread in the thread pool of the application process; and
   using the first target communication thread to communicate with the system process;
   wherein after using the first target communication thread to communicate with the system process, the method further comprises:
   determining again whether the application process has idle communication threads in the thread pool of the application process when the system process needs to communicate with the application process again;
   determining whether the number of idle communication threads in the thread pool of the application process is not less than a first preset number if the application process has an idle communication thread in the thread pool of the application process; and
   destroying the first target communication thread after the communication between the first target communication thread and the system process is completed if the number of idle communication threads in the thread pool of the application process is not less than the first preset number; and
   using any of the idle communication threads to communicate with the system process that needs to communicate again;

wherein after determining whether the number of idle communication threads in the thread pool of the application process is not less than a first preset number, the method further comprises:
  determining whether the first target communication thread is in an idle state if the number of idle communication threads in the thread pool of the application process is less than a first preset number; and
  using the first target communication thread to communicate with the system process that needs to communicate again if the first target communication thread is in an idle state;
wherein after determining whether the first target communication thread is in an idle state, the method further comprises:
  determining whether the number of idle communication threads in the thread pool of the application process is not less than a second preset number if the first target communication thread is not in an idle state, wherein the second preset number is less than the first preset number; and
  using any idle communication thread to communicate with the system process that needs to communicate again if the number of idle communication threads in the thread pool of the application process is not less than the second preset number.

6. The non-transitory computer-readable storage medium according to claim 5, wherein after determining whether the number of idle communication threads in the thread pool of the application process is not less than a second preset number, the method further comprises:
  creating a second target communication thread if the number of idle communication threads in the thread pool of the application process is less than the second preset number; and
  using the second target communication thread to communicate with the system process that needs to communicate again.

7. The non-transitory computer-readable storage medium according to claim 5, wherein after determining whether the first target communication thread is in an idle state, the method further comprises:
  creating a second target communication thread if the first target communication thread is not in an idle state; and
  using the second target communication thread to communicate with the system process that needs to communicate again.

8. The non-transitory computer-readable storage medium according to claim 5, wherein after determining whether the application process has idle communication threads in the thread pool of the application process, the method further comprises:
  using the idle communication threads to communicate with the system process if the application process has idle communication threads in the thread pool of the application process.

9. A mobile terminal, wherein the mobile terminal includes a processor and a memory, a computer program is stored in the memory, and the processor calls the computer program stored in the memory to execute the method comprising:
  determining whether an application process has idle communication threads in a thread pool of the application process when a system process needs to communicate with the application process;
  using the idle communication threads to communicate with the system process if the application process has idle communication threads in the thread pool of the application process;
  creating a first target communication thread if the application process has no idle communication thread in the thread pool of the application process;
  using the first target communication thread to communicate with the system process;
  determining again whether the application process has idle communication threads in the thread pool of the application process when the system process needs to communicate with the application process again;
  determining whether the number of idle communication threads in the thread pool of the application process is not less than a first preset number if the application process has an idle communication thread in the thread pool of the application process; and
  destroying the first target communication thread after the communication between the first target communication thread and the system process is completed if the number of idle communication threads in the thread pool of the application process is not less than the first preset number;
  using any of the idle communication threads to communicate with the system process that needs to communicate again;
wherein after determining whether the number of idle communication threads in the thread pool of the application process is not less than a first preset number, the method further comprises:
  determining whether the first target communication thread is in an idle state if the number of idle communication threads in the thread pool of the application process is less than a first preset number; and
  using the first target communication thread to communicate with the system process that needs to communicate again if the first target communication thread is in an idle state;
wherein after determining whether the first target communication thread is in an idle state, the method further comprises:
  determining whether the number of idle communication threads in the thread pool of the application process is not less than a second preset number if the first target communication thread is not in an idle state, wherein the second preset number is less than the first preset number; and
  using any idle communication thread to communicate with the system process that needs to communicate again if the number of idle communication threads in the thread pool of the application process is not less than the second preset number.

10. The mobile terminal according to claim 9, wherein after determining whether the number of idle communication threads in the thread pool of the application process is not less than a second preset number, the method further comprises:
  creating a second target communication thread if the number of idle communication threads in the thread pool of the application process is less than the second preset number; and
  using the second target communication thread to communicate with the system process that needs to communicate again.

11. The mobile terminal according to claim 9, where determining whether the first target communication thread is in an idle state, the method further comprises:
- creating a second target communication thread if the first target communication thread is not in an idle state; and
- using the second target communication thread to communicate with the system process that needs to communicate again.

* * * * *